UNITED STATES PATENT OFFICE.

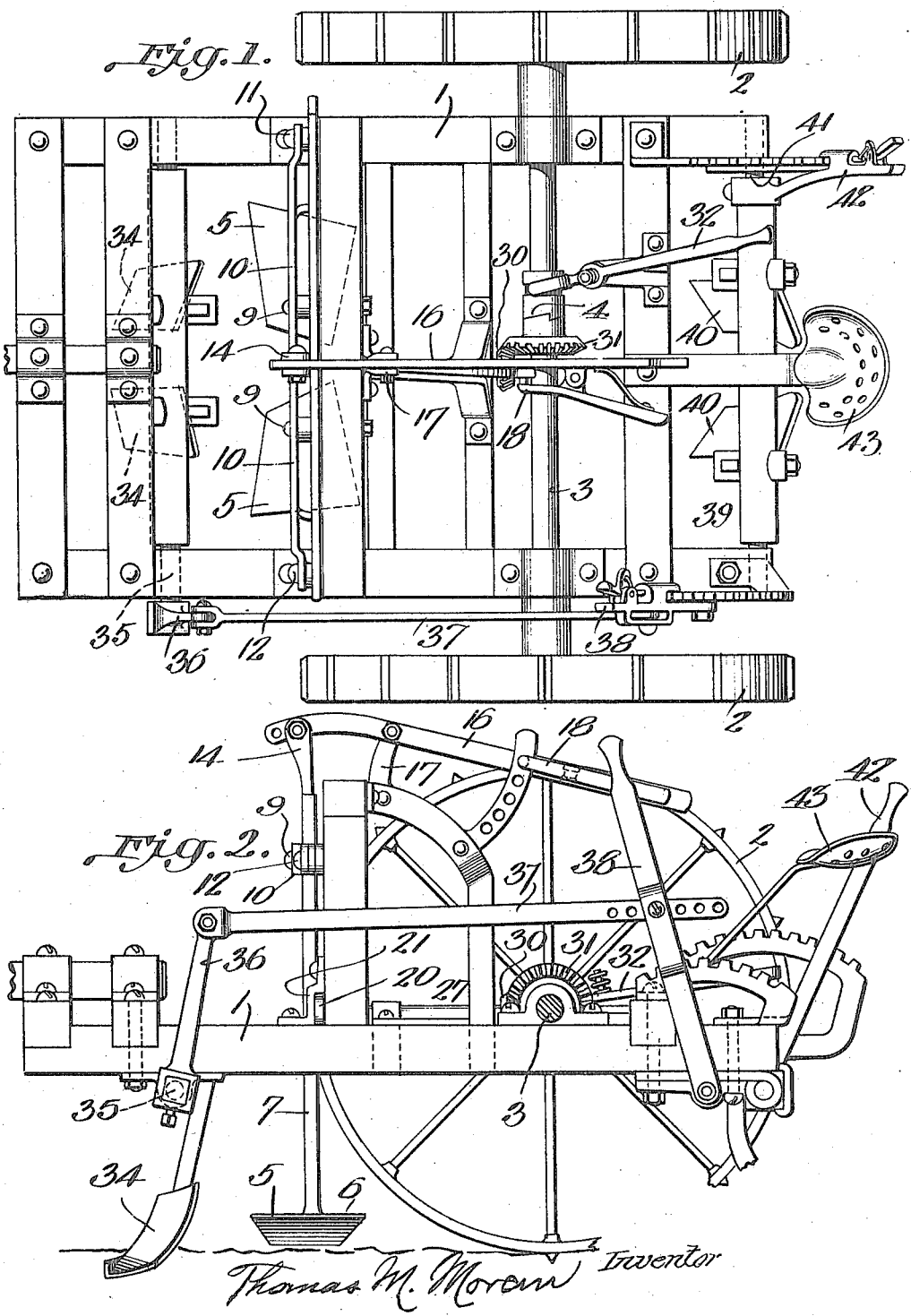

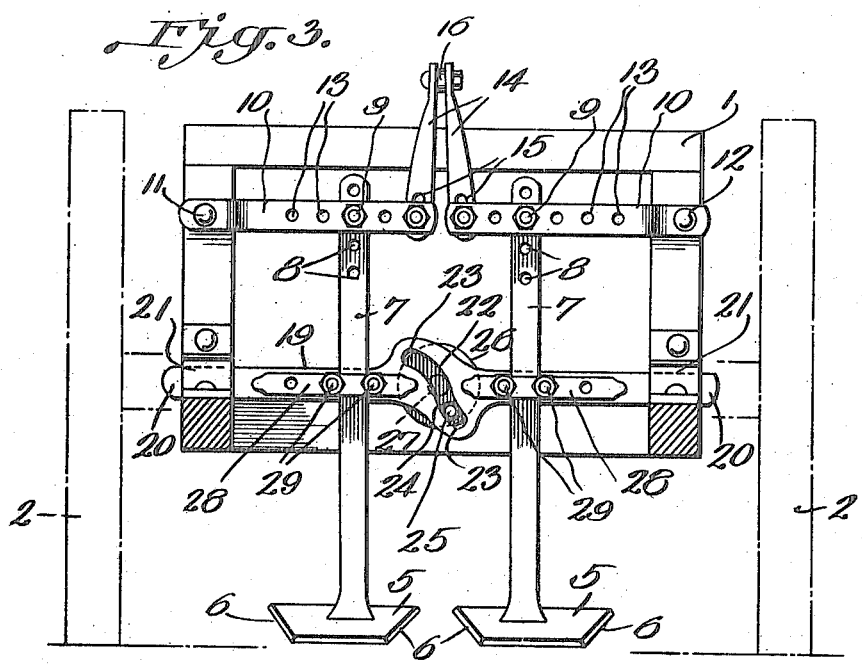

THOMAS M. MORAN, OF COLTON, CALIFORNIA, ASSIGNOR OF ONE-HALF TO R. E. THOMAS, OF LOS ANGELES, CALIFORNIA.

COTTON-CHOPPER.

1,268,042.  Specification of Letters Patent.  Patented May 28, 1918.

Application filed August 29, 1916. Serial No. 117,508.

*To all whom it may concern:*

Be it known that I, THOMAS M. MORAN, a citizen of the United States, residing at Colton, in the county of San Bernardino and State of California, have invented certain new and useful Improvements in Cotton-Choppers; and I do hereby declare the following to be a full, clear, and exact description of the invention, such as will enable others skilled in the art to which it appertains to make and use the same.

This invention relates to certain new and useful improvements in agricultural implements and contemplates more especially a cotton chopper for use in the cultivation of cotton.

The present invention has for an object the production of a machine for thinning and cutting out cotton and other plants, and includes among other things a novel chopping mechanism, means for easily and effectively operating the said mechanism, and adjusting devices for the chopping mechanism.

Another object of this invention is to produce a cotton chopper including in combination oppositely spaced chopping blades or hoes, and means including a reciprocating mechanism of simple, durable and inexpensive construction for operating the chopping hoes.

The invention further consists in the combination and arrangement of the several parts hereinafter described and pointed out in the appended claims.

In the accompanying drawings which show by way of illustration an embodiment of my invention, Figure 1 is a top plan view of my improved cultivator.

Fig. 2 is a side elevation thereof, and

Fig. 3 is a detail cross sectional view through the frame illustrating the mechanism for operating the choppers.

The present invention has been primarily designed for use in the cultivation of cotton, but it will be readily understood that it may be employed for beet and other plant culture. Referring to the drawings, the cultivator or cotton chopper comprises a frame 1 suitably mounted upon the supporting wheels 2 provided on each end of a shaft 3 journaled in the said frame. A suitable clutch 4 is provided on said shaft for controlling the transmission of power from the wheels 2 to the chopping mechanism by gearing means to be hereinafter described.

The chopping machinsm includes oppositely arranged cutting blades or chopping hoes 5 each having cutting or chopping edges 6, and supporting arms or helves 7. The upper ends of the supporting arms or helves 7 are each provided with a series of openings 8 through one each of which passes bolts 9. The bolts 9 form the pivots upon which the chopping blades swing. The upper ends of the supporting arms or helves 7 are pivotally connected by the bolts 9 to oppositely arranged bars 10 secured to the frame 1 at 11 and 12, respectively. These arms are by preference pivotally secured to the frame so as to permit of readily elevating and lowering the cutting blades by devices to be hereinafter described.

Suitable openings 13 are formed in the arms or bars 10 whereby the relative lateral adjustment of the pivot points for the supporting arms or helves can be obtained. The relative vertical adjustment of the cutting blades is accomplished by shifting the bolts 9 to one of the desired openings 8 in each of the supporting arms or helves.

Adjustably connected to the inner end of each bar 10 through the medium of openings 15, are links 14, to the upper ends of which latter is adjustably connected one end of a hand lever 16. This hand lever 16 is partially supported in the bracket 17 extending upwardly from the frame, and is provided with a suitable locking device 18 for holding the said hand lever in adjusted position. This locking device may be of any well known construction, and forms no part of the present invention.

The means for reciprocating the cutting blades or hoes laterally of the machine as it its drawn through the rows of cotton, comprises a horizontally disposed member or bar 19, the ends 20 of which are normally positioned in guides 21 secured to the frame of the machine. The intermediate portion of the bar 19 is enlarged as shown, and has formed therein a slot 22 the opposite ends of which are oppositely curved, as at 23.

Coöperating with the slot 22 and extending therein is a roller 24 positioned upon a pin 25 extending from a crank disk 26 secured to one end of a driving shaft 27. The roller 24 is positioned eccentrically with relation to the driving shaft 27 and operates within the slot 22 when the driving shaft 27 is rotated. The reciprocation of the roller 24 against the relative oppositely curved portion 23 of the slot 22 permits of an easy rotation of the said roller and as a result, a free and even movement of the reciprocated member or bar 19. The cutting blades or chopping hoes 5 are adjustably attached to the reciprocating bar 19 by means of plates 28 and bolts 29. The bolts are preferably positioned upon each side of the supporting arms or helves 7 and are arranged so as to pass through registering openings in the reciprocating bar 19 and plates 28. The relatively lateral adjustment of the cutting blades or chopping hoes determines the position of the bolts 29 upon each side of each supporting arm.

The gearing for driving the shaft 27 comprises a beveled gear 30 secured to the said shaft 27 which is designed to mesh with a similar gear 31 secured to one section of the clutch 4. The other section of the clutch 4 being secured to the shaft 3 it will be readily seen that as the clutch lever 32 is moved to engage the clutch the chopping hoes will be operated, and when operated to disengage the clutch the chopping mechanism will remain inoperative as the machine is moved.

The cutting blades or chopping hoes as shown, are each provided with opposite cutting edges 33 so as to operate upon the plants when reciprocated in both directions, that is to say, the cotton rows are cut and thereby thinned out upon each inward and outward movement of the reciprocating bar 19.

Coöperating with the chopping hoes are forwardly arranged scraping blades 34. These scraping blades 34 are carried by a cross shaft 35 mounted upon the underside frame of the machine, which when rocked by means of the crank arm 36, link 37 and hand lever connection 38 operate to elevate or lower the said blades with relation to the chopping hoes and the plants under cultivation. A suitable locking device 39 is provided for said hand lever 38, and serves to hold the scraping blades 34 in adjusted position.

Mounted rearwardly of the chopping hoes are relatively arranged coöperating blades or plows 40. These plows are secured to a rock shaft 41 mounted upon the under side of the frame of the machine. A suitable hand lever 42 is connected to the rock shaft 41 which, when moved, elevates or lowers the plows 40 with relation to the chopping hoes.

Any form of propulsion may be employed to draw the cultivator through the plants. A seat 43 is preferably positioned upon the frame, from which the aforesaid clutch and hand lever may be readily operated.

In operation, the cultivator is drawn through a row of cotton or other plants with the clutch 4 engaged, and the scraping blades 34 and plows 40 relatively adjusted for coöperation with the chopping hoes 5. Power being transmitted through the supporting wheels 2 to the driving shaft 27, by reason of the meshing beveled gears 30 and 31, it will be seen that the crank disk will be caused to rotate, thereby causing the projecting roller 24 to operate within the slot 22 and reciprocate the bar 19. As the bar 19 is moved back and forth, movement is transmitted to the supporting arms or helves 7 which are in turn swung upon the pivot bolt 9. The cutting blades or chopping hoes 5 are thereby caused to swing laterally across the rows of plants in the row through which the cultivator is being drawn and to cut the plants away from the rows which are to be cultivated.

The coöperating forwardly and rearwardly arranged scraping blades 34 and plows 40, respectively, serve to further clear the rows, to loosen, turn, and cover the soil cultivated.

While I have shown the arrangement and combination hereinbefore described, it will be understood that various changes may be made in the details of construction, combination, and the arrangement of parts without in the least departing from the spirit of my invention.

What I claim is:

1. A cultivator of the class described including in combination a supporting frame, oppositely arranged coöperating chopping hoes, pivoted supports for said chopping hoes, adjusting devices for pivoting and laterally positioning said chopping hoes upon the said pivoted supports, means including a reciprocating member for swinging said chopping hoes upon the pivoted adjusting devices, and means for adjustably attaching the chopping hoes to the reciprocating member with relation to the aforesaid pivoted supports.

2. A cultivator of the class described including in combination a supporting frame, oppositely arranged chopping hoes pivotally carried by said frame, and means for moving said chopping hoes, said means comprising a horizontally disposed bar having an intermediate slot therein and a rotating roller operable in said slot.

3. A cultivator of the class described including in combination a supporting frame, oppositely arranged chopping hoes pivotally carried by said frame, and means for moving said chopping hoes, said means including a horizontally disposed bar having an intermediate slot therein oppositely curved at each end, guides for said bar, and a rotating roller alternately operable against each curved end of the aforesaid slot.

4. A cultivator of the class described including in combination a wheeled supporting frame, oppositely arranged chopping hoes carried by said frame, means including a horizontally disposed bar for reciprocating said chopping hoes, an intermediate slot in said bar, a roller adapted to operate within said slot, a crank pin for said roller, and means including a driving shaft interconnected with the wheels of the cultivator for actuating the crank pin.

THOMAS M. MORAN.

Copies of this patent may be obtained for five cents each, by addressing the "Commissioner of Patents, Washington, D. C."